(12) United States Patent
Zhao et al.

(10) Patent No.: US 7,051,865 B1
(45) Date of Patent: May 30, 2006

(54) AUGER FLIGHT SUPPORT

(75) Inventors: Kai Zhao, Willowbrook, IL (US); Jishan Jin, Naperville, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/173,541

(22) Filed: Jul. 1, 2005

(51) Int. Cl.
*B65G 33/26* (2006.01)

(52) U.S. Cl. .................................. 198/677; 198/676

(58) Field of Classification Search ............... 198/657, 198/676, 677, 661, 666, 670, 672
See application file for complete search history.

(56) References Cited

U.S. PATENT DOCUMENTS

| | | | |
|---|---|---|---|
| 289,751 A | 12/1883 | Chivill | 198/669 |
| 349,390 A | 9/1886 | Gilbert et al. | 198/669 |
| 355,124 A | 12/1886 | Birkholz | 198/665 |
| 415,604 A * | 11/1889 | Birkholz | 198/665 |
| 701,969 A | 6/1902 | Van Arsdell | 403/256 |
| 1,371,116 A | 3/1921 | Quelms | 403/188 |
| 1,643,986 A | 10/1927 | Hartley | 198/550.1 |
| 1,761,591 A | 6/1930 | Ryder | 198/666 |
| 2,014,636 A | 9/1935 | Rosendahl | 566/343 |
| 3,659,700 A * | 5/1972 | Tunderman | 198/635 |
| 4,429,782 A | 2/1984 | Pierson | 198/677 |
| 6,093,099 A * | 7/2000 | Groff | 460/71 |
| 6,106,390 A * | 8/2000 | Doggrell et al. | 460/141 |
| 6,688,970 B1 | 2/2004 | Tanis | 460/68 |

* cited by examiner

*Primary Examiner*—James R. Bidwell
(74) *Attorney, Agent, or Firm*—Michael G. Harms; John William Stader; Stephen A. Bucchianeri

(57) ABSTRACT

An auger flight support includes a mounting portion having an arcuate concave surface adapted to be fixedly mounted around at least a portion of an outer circumferential surface of an auger shaft adjacent to a flight extending along a helical path around the shaft, and a support portion in connection with the mounting portion, including an outwardly extending edge positioned and oriented for abutting and affixing to a radially outwardly extending edge of a flight of an auger when the mounting portion is mounted around at least a portion of an outer circumferential surface of the auger, for supporting the flight and forming an extension of the flight beyond the edge thereof, and so as to be capable of more effectively transferring and distributing loads from the flight for reducing occurrences of fatigue related failures.

21 Claims, 4 Drawing Sheets

US 7,051,865 B1

AUGER FLIGHT SUPPORT

TECHNICAL FIELD

This invention relates generally to a support for a helical flight of an auger, and more particularly, to an auger flight support which results in lower stress concentrations when mounted to an auger shaft, for reducing possible occurrences of fatigue related failure.

BACKGROUND ART

A wide variety of supports have been long utilized for supporting an auger flight on an auger shaft. Reference in this regard, Van Arsdell U.S. Pat. No. 701,969 entitled End Support For Spiral Conveyors; Quelms U.S. Pat. No. 1,371,116 entitled Screw Conveyor Drive Clamp; Hartley U.S. Pat. No. 1,643,986 entitled Power Driven Conveyor; and Ryder U.S. Pat. No. 1,761,591 entitled Spiral Conveyor Coupling, all of which disclose manners of affixing a helical auger flight to a shaft, typically utilizing fasteners of some sort. It is evident from a study of the referenced patents, that numerous of these older style auger flight supports have shapes which require bending and other additional manufacturing steps so as to be disadvantageous costwise in a modern context.

Reference also FIG. 1 of the present application, which illustrates a more modern auger flight support, which involves welding a triangular member between an auger flight and shaft. However, this more modern auger support has been found to suffer from undesirable high stress concentrations, which can result in premature failure.

Thus, what is sought is an auger flight support that overcomes one or more of the problems and disadvantages set forth above.

SUMMARY OF THE INVENTION

What is disclosed is an auger flight support which overcomes one or more of the problems and disadvantages set forth above, by providing a weldable member which is easily manufactured, and provides improved load transfer and distribution, for reducing stress concentrations that can lead to fatigue failures.

According to a preferred aspect of the invention, an auger flight support includes a mounting portion having an arcuate concave surface adapted to be fixedly mounted around at least a portion of an outer circumferential surface of an auger shaft adjacent to an auger flight extending along a helical path around the shaft. The flight support includes a support portion in connection with the mounting portion, including an outwardly extending edge positioned and oriented for abutting and affixing to a radially extending edge of a flight of an auger when the mounting portion is mounted around at least a portion of an outer circumferential surface of the auger, for supporting the flight and forming an extension of the flight beyond the edge thereof.

According to another preferred aspect of the invention, the mounting portion is welded to the outer circumferential surface of an auger shaft and is ring shaped so as to distribute loads around a substantial portion of the circumference of the shaft.

According to another preferred aspect, the outwardly extending edge of the support portion is welded to the edge of the flight along substantially the radial length thereof. Still further, the edge of the support portion can include a groove which receives the edge of the auger flight, for facilitating support thereof, and transfer of loads applied against the flight through the support portion to the mounting portion, for distribution about the auger shaft.

According to a still further preferred aspect of the invention, the mounting portion and the support portion of the auger flight support are substantially flat and integrally formed from flat plate or sheet metal material. As a result, the flight support can be stamped or plasma cut from the flat plate or sheet metal material, to facilitate simple and inexpensive manufacture.

DETAILED DESCRIPTION OF THE INVENTION

Figure 1:
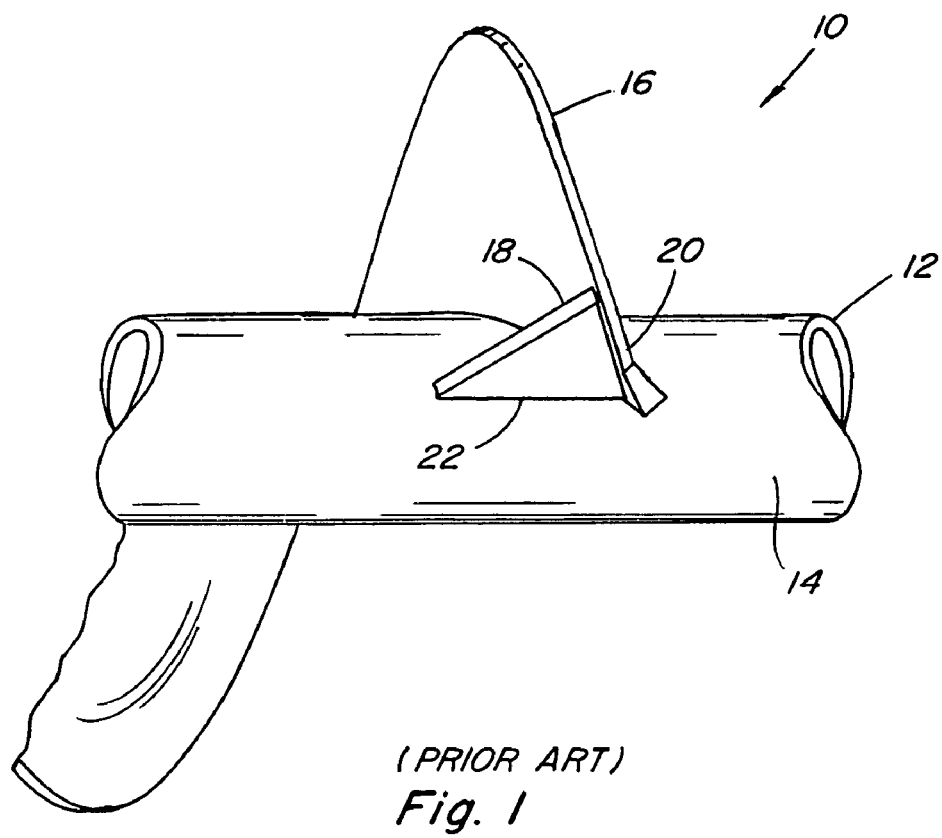
FIG. 1 is a fragmentary side view of a segment of a representative helical auger including a prior art auger flight support.

Referring now to the drawings, wherein preferred embodiments of the present invention are shown, in FIG. 1, a representative helical auger 10 is shown including an elongate shaft 12 having a longitudinally extending outer circumferential surface 14 therearound, around which extends a radially outwardly extending helical auger flight 16, in the well known manner. Auger 10 includes a prior art auger flight support 18 disposed adjacent to a terminal end 20 of flight 16, support 18 being suitably affixed to outer circumferential surface 14 and flight 16 by welding, for supporting flight 16 and transferring loads applied thereagainst to circumferential surface 14 when auger 10 is rotated in contact with material to be conveyed thereby, which can be, for instance, harvested grain or other granular or particulate materials.

A problem that has been observed as a result of the use of auger flight supports such as support 18 in the manner just described, is concentration of loads along an edge 22 of support 18 in contact with surface 14 of shaft 12, which can result in stress leading to premature fatigue related failures at that location.

Referring also to FIGS. 2, 3, 4, 5 and 6, an auger flight support 24 constructed and operable according to the teachings of the present invention is shown, which has been found to alleviate and overcome one or more of the problems and disadvantages set forth above. Auger flight support 24 is preferably a generally flat member including an arcuate shaped, and more preferably, a ring shaped, mounting portion 26 which mounts around an outer circumferential surface of an auger, here depicted by surface 14 of auger 10.

Auger flight support 24 includes a support portion 28 extending radially outwardly from mounting portion 26 and preferably having a triangular shape. Support portion 28 also includes a radially outwardly extending edge 30 which terminates at a radially outermost tip 32.

Edge 30 preferably includes a recessed radially extending groove 34, which groove 34 is adapted for cooperatively receiving a radially outwardly extending terminal edge of an auger flight, here, represented by radially outwardly extending edge 36 of flight 16 of auger 10. Radially outwardly extending edge 30 of flight support 24 is rigidly affixed to a radially outwardly extending edge of an auger flight, such as edge 36, in a suitable manner, such as by welding, here represented by weld bead 38 shown in FIG. 3. Here, it should be noted and understood that it is contemplated that radially outwardly extending edge 36 of flight support 24 according to the invention is to be affixed to a terminal edge of an auger flight in a manner adequate to support the auger flight to withstand forces and loads acting to deflect or bend the flight, or peel the flight from the shaft, such as those that can be encountered during start up of rotation of an auger, or when flow of material being conveyed by the auger becomes blocked or plugged.

It is desirable for loading conditions resulting from such conditions, as well as normal operation, and applied against an auger flight, to be transferred by support portion 28 radially inwardly to mounting portion 26, so as to be distributed at least partially around an outer circumferential surface of a shaft of an auger, such as surface 14 of auger 12, to both provide support for the auger flight, and reduce stress concentrations resulting from the loads which can result in fatigue failures.

Figure 3:
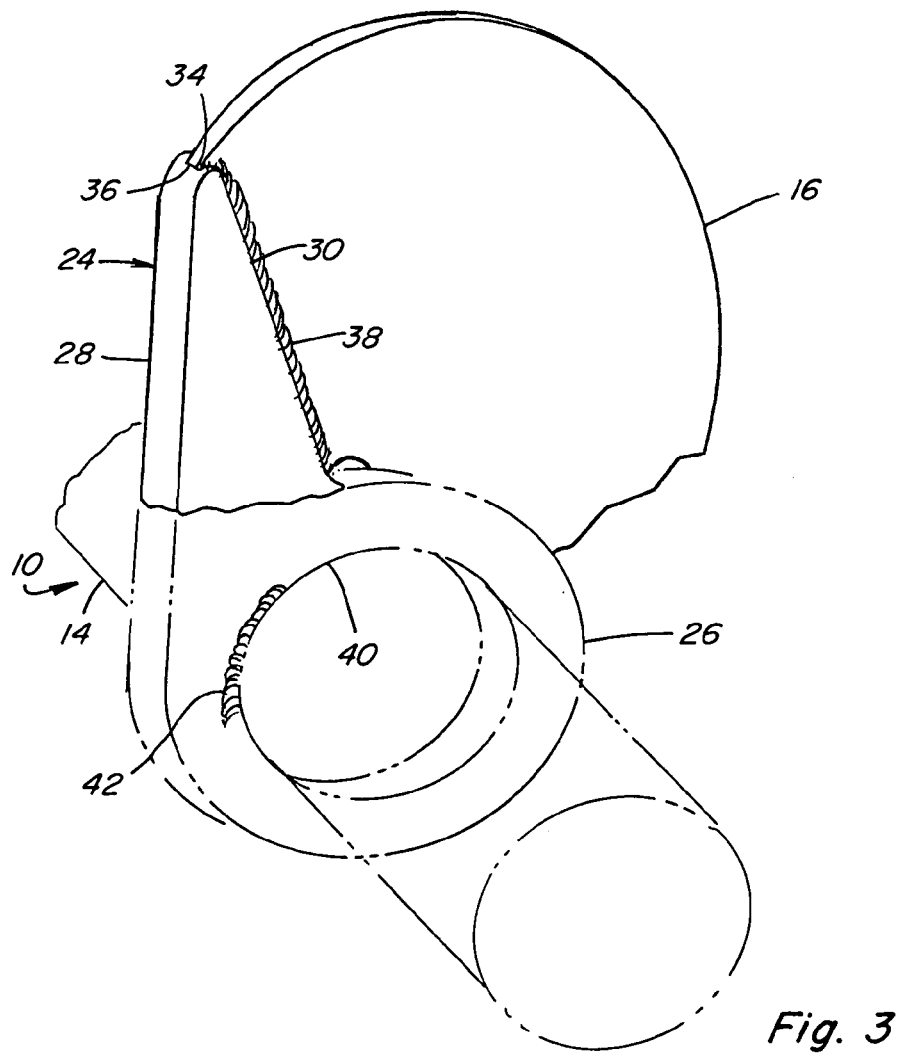
FIG. 3 is another perspective view of the auger flight support of FIG. 2 shown partially in phantom and illustrating welded attachment of a support portion thereof to a helical flight of an auger also shown partially in phantom.
Figure 4:
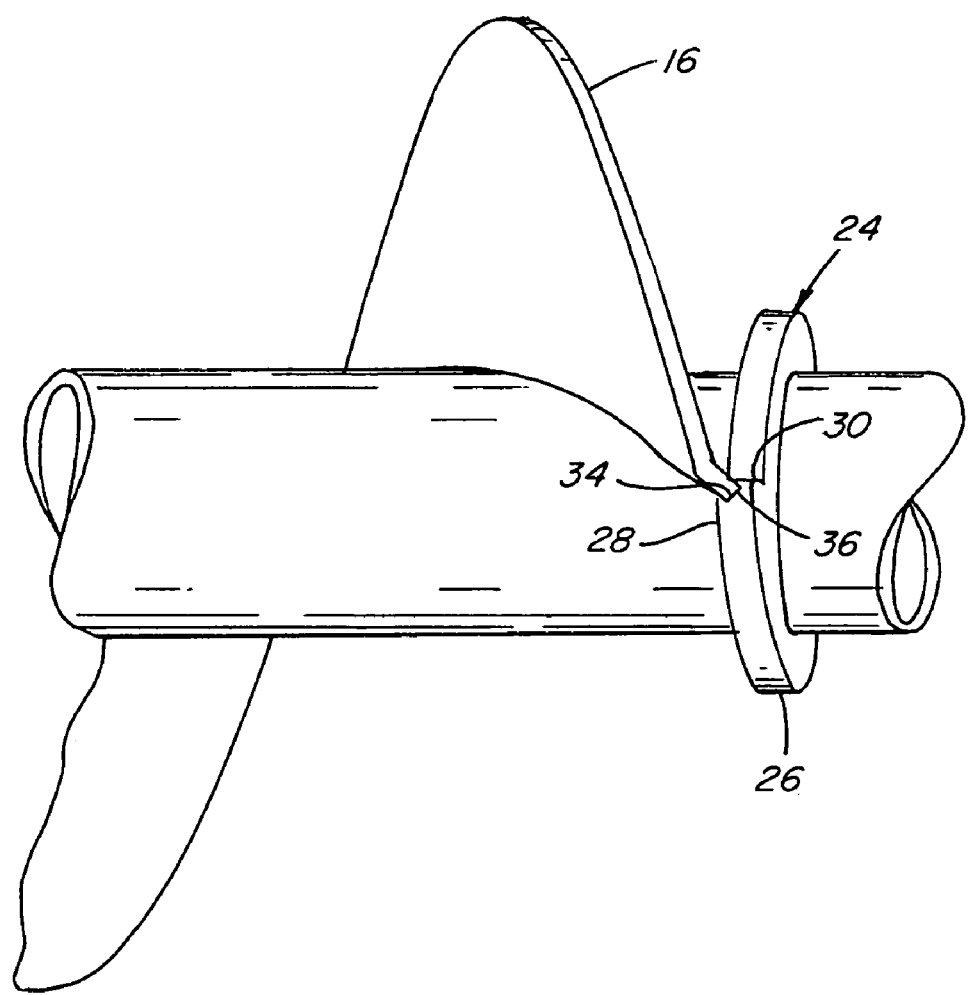
FIG. 4 is a fragmentary perspective view of a representative auger including an auger flight support of the invention in connection with a helical flight thereof.
Figure 5:
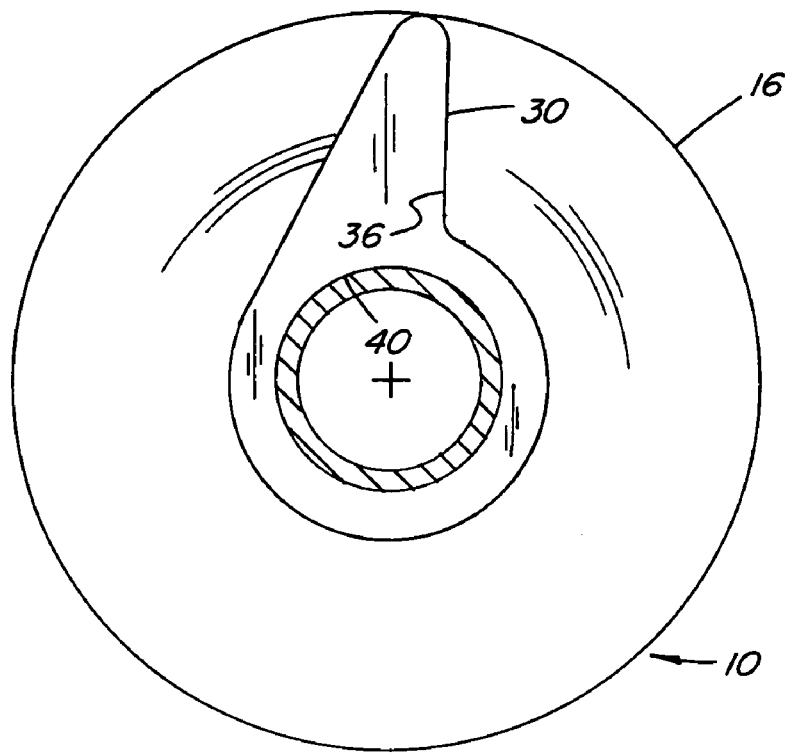
FIG. 5 is an end sectional view of the auger of FIG. 4, showing the auger flight support of the invention in connection with the helical flight thereof.
Figure 6:
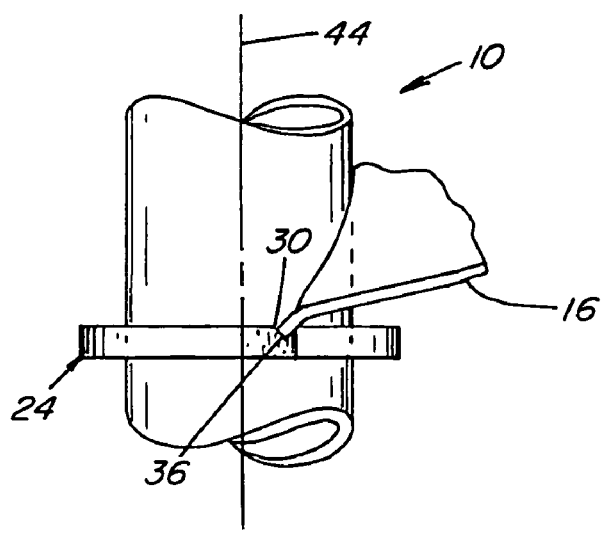
FIG. 6 is a reduced fragmentary top view of the auger and auger flight support of FIGS. 4 and 5.

To effect transfer and distribution of loads and stress around the outer circumference surface of an auger shaft, such as surface 14 of shaft 12, an inner circumferential surface 40 of mounting portion 26 of flight support 24 is preferably welded or otherwise suitably rigidly affixed to an underlying portion of the outer circumferential surface of an auger shaft around which flight support 24 is mounted, as illustrated by weld bead 42 in FIG. 3. Here, it should be noted that mounting portion 26 of auger flight support 24 is illustrated in FIGS. 3, 4, 5 and 6 as extending around outer circumferential surface 14 of auger 10 in perpendicular relation to a longitudinally extending rotational axis 44 of the auger, shown in FIG. 6.

Figure 7:
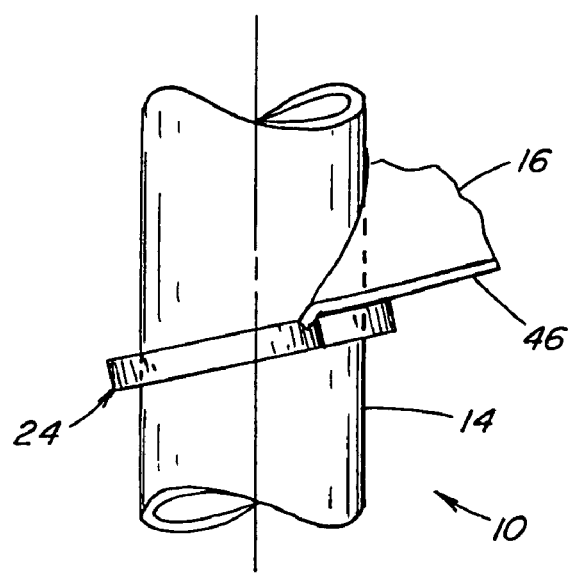
FIG. 7 is another reduced fragmentary top view of the auger of FIGS. 4 and 5, showing an alternative auger flight support of the invention in connection therewith.
Figure 2:
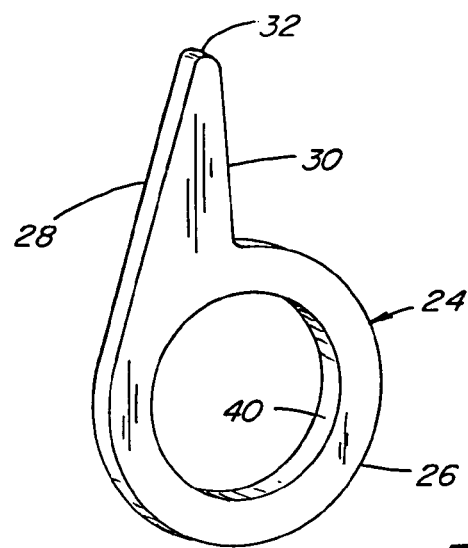
FIG. 2 is a perspective view of an auger flight support according to the invention.

Referring also to FIG. 7, auger flight support 24 of the invention is alternatively shown mounted about surface 14 of auger 10 at an angle to perpendicular as alternatively contemplated according to the invention, so as to be positioned more in line with a radial outer edge 46 of an auger flight 16, to facilitate flow of any material being conveyed by the auger which may come in contact with flight support 24. In either this mounting configuration or that illustrated in FIGS. 3, 4, 5 and 6, it is evident that auger flight support 24 can be generally flat over its entire extent, so as to be easily and simply manufactured from flat plate or sheet of steel, aluminum, or another metal or material, and can be stamped or cut, for instance by a well known commercially available plasma cutting process.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An auger flight support, comprising:
    a mounting portion having an arcuate concave surface adapted to be fixedly mounted around at least a portion of an outer circumferential surface of an auger shaft adjacent to a flight extending along a helical path around the shaft; and
    a support portion in connection with the mounting portion, including an outwardly extending edge positioned and oriented for abutting and affixing to a radially outwardly extending edge of a flight of an auger when the mounting portion is mounted around at least a portion of an outer circumferential surface of the auger, for supporting the flight and forming an extension of the flight beyond the edge thereof.

2. The auger flight support of claim 1, wherein the outwardly extending edge of the support portion further comprises a groove adapted for receiving at least a portion of a radially outwardly extending edge of a flight of an auger.

3. The auger flight support of claim 1, wherein the support portion is triangular shaped, including a base adjacent to the mounting portion and a radial outer tip positioned to be located adjacent to a radial outer end of a flight of an auger, the base being larger in extent compared to the tip, such that the support portion is operable for transferring and distributing loads applied thereagainst by a flight to a substantial portion of the mounting portion.

4. The auger flight support of claim 3, wherein the mounting portion is ring shaped so as to be operable for distributing loads transferred thereto around at least a substantial portion of an outer circumferential surface of an auger shaft on which the mounting portion is mounted.

5. The auger flight support of claim 1, wherein the mounting portion is welded to an outer circumferential surface of an auger shaft.

6. The auger flight support of claim 1, wherein the outwardly extending edge of the support portion is welded to a radially outwardly extending edge of a flight of an auger.

7. The auger flight support of claim 1, wherein the mounting portion and the support portion are substantially flat and integrally formed from flat plate or sheet metal material.

8. The auger flight support of claim 7, wherein the flight support is stamped from the flat plate or sheet metal material.

9. The auger flight support of claim 7, wherein the flight support is plasma cut from the flat plate or sheet metal material.

10. The auger flight support of claim 1, wherein the support portion is positioned so as to be oriented at an acute angle to a helical surface of a flight of an auger when mounted on a shaft thereof.

11. An auger flight support, comprising:
    a generally flat member including an arcuate shaped mounting portion adapted to be mounted at least partially around an outer circumferential surface of a shaft of a helical auger, and a triangular shaped support portion extending radially outwardly from the mounting portion and including a radially outwardly extending edge positioned to extend along and be affixed to a radially outwardly extending edge of a helical flight extending around an outer circumferential surface of a shaft of an auger when the mounting portion is mounted therearound, for forming an extension of the flight and supporting the flight for transferring loads applied thereagainst to the mounting portion of the flight support for distribution thereby around the outer circumferential surface of the shaft.

12. The auger flight support of claim 11, wherein the radially outwardly extending edge of the support portion further comprises a groove adapted for receiving at least a portion of a radially outwardly extending edge of a flight of an auger.

13. The auger flight support of claim 11, wherein the mounting portion is ring shaped so as to be operable for distributing loads transferred thereto around at least a substantial portion of an outer circumferential surface of an auger shaft on which the mounting portion is mounted.

14. The auger flight support of claim 11, wherein the mounting portion is welded to an outer circumferential surface of an auger shaft.

15. The auger flight support of claim 14, wherein the radially outwardly extending edge of the support portion is welded to a radially outwardly extending edge of a flight of the auger.

16. The auger flight support of claim 11, wherein the flight support is stamped from the flat plate or sheet metal material.

17. The auger flight support of claim 11, wherein the flight support is plasma cut from the flat plate or sheet metal material.

18. An auger, comprising:
an elongate shaft having a circumferential outer surface therearound with a flight extending radially outwardly therefrom extending along a helical path therearound and terminating at a radially outwardly extending edge; and an auger flight support including a generally flat member including an arcuate shaped mounting portion mounted at least partially around the outer circumferential surface of the shaft of the auger, and a triangular shaped support portion extending radially outwardly from the mounting portion and including a radially outwardly extending edge extending along and affixed to the radially outwardly extending edge of the flight such that the support portion forms an extension of the flight which tapers radially inwardly to the outer circumferential surface of the shaft and supports the flight for transferring loads applied thereagainst to the mounting portion of the flight support for distribution thereby around the outer circumferential surface of the shaft.

19. The auger of claim 18, wherein the radially outwardly extending edge of the support portion further comprises a groove which receives at least a portion of the radially outwardly extending edge of the flight of an auger.

20. The auger of claim 18, wherein the mounting portion is ring shaped so as to be operable for distributing loads transferred thereto around at least a substantial portion of the outer circumferential surface of the shaft.

21. The auger of claim 18, wherein the radially outwardly extending edge of the support portion is welded to the radially outwardly extending edge of the flight.

* * * * *